US006792862B1

(12) United States Patent
Pietrzak et al.

(10) Patent No.: US 6,792,862 B1
(45) Date of Patent: Sep. 21, 2004

(54) APPARATUS FOR DELIVERING PRINTING PLATES TO AN EXTERNAL DRUM IMAGING SYSTEM

(75) Inventors: Amy Pietrzak, Londonderry, NH (US); Angelo Diramio, Medford, MA (US); Mike O'Rourke, Salem, NH (US)

(73) Assignee: Agfa Corporation, Wilmington, MA (US)

(*) Notice: Subject to any disclaimer, the term of this patent is extended or adjusted under 35 U.S.C. 154(b) by 0 days.

(21) Appl. No.: 10/419,532

(22) Filed: Apr. 21, 2003

(51) Int. Cl.[7] .......................... B41F 21/00; B65H 5/04; B65G 15/00

(52) U.S. Cl. .................... 101/477; 101/401.1; 271/225; 271/184; 198/408

(58) Field of Search .............................. 101/401.1, 477, 101/463.1, 479, 480; 271/225, 184, 185, 69, 275, 277; 198/408; 400/646, 647, 647.1, 578, 582

(56) References Cited

U.S. PATENT DOCUMENTS

| | | | | |
|---|---|---|---|---|
| 3,605,992 A | | 9/1971 | Weber | |
| 4,141,457 A | | 2/1979 | Nocek | |
| 4,537,208 A | | 8/1985 | Kuhl | |
| 5,427,225 A | | 6/1995 | Namba | |
| 5,464,090 A | | 11/1995 | Lucas | |
| 6,354,208 B1 | | 3/2002 | Bos et al. | |
| 6,604,465 B2 | * | 8/2003 | Tice et al. | 101/415.1 |
| 2001/0013928 A1 | | 8/2001 | Koizumi et al. | |
| 2002/0178948 A1 | * | 12/2002 | Platte et al. | 101/477 |
| 2003/0056671 A1 | * | 3/2003 | Hashiguchi | 101/477 |

FOREIGN PATENT DOCUMENTS

| | | | |
|---|---|---|---|
| WO | WO 00/17071 | * | 3/2000 |

* cited by examiner

*Primary Examiner*—Leslie J. Evanisko
(74) *Attorney, Agent, or Firm*—Robert A. Sabourin; John A. Merecki

(57) ABSTRACT

An apparatus for delivering a printing plate to an external drum platesetter includes: a plate traversing table for displacing a printing plate into a staging position; and a plate angling table, nested within the plate traversing table, for rotating the printing plate between the staging position and a loading position. The plate traversing table includes: a first shaft; a second driven shaft including a plurality of nip rollers; a plurality of pulleys mounted to the first and second shafts; a plurality of rotatable belts, extending between corresponding sets of the pulleys on the first and second shafts; and a drive system for rotating the driven shaft.

27 Claims, 8 Drawing Sheets

APPARATUS FOR DELIVERING PRINTING PLATES TO AN EXTERNAL DRUM IMAGING SYSTEM

FIELD OF THE INVENTION

The present invention is in the field of imaging systems. More particularly, the present invention provides an apparatus for delivering printing plates to an external drum imaging system.

BACKGROUND OF THE INVENTION

In external drum imaging systems, a movable optical carriage is commonly used to displace an image recording source in a slow scan direction while a cylindrical drum, having recording media mounted on an external surface thereof, is rotated with respect to the image recording source. The drum rotation causes the recording media to advance past the image recording source along a fast scan direction that is substantially perpendicular to the slow scan direction.

The image recording source may include an optical system for generating one or more imaging beams that are scanned across the surface of the recording media. Each imaging beam may be separately modulated according to a digital information signal representing data corresponding to the image to be recorded.

The recording media to be imaged by an external drum imaging system is commonly supplied in discrete, flexible sheets, hereinafter collectively referred to as "printing plates." Each printing plate may comprise one or more layers supported by a support substrate, which for many printing plates is a plano-graphic aluminum sheet. Other layers may include one or more image recording (i.e., "imageable") layers such as a photosensitive, radiation sensitive, or thermally sensitive layer, or other chemically or physically alterable layers. Printing plates that are supported by a polyester support substrate are also known and can be used in the present invention. Printing plates are available in a wide variety of sizes, typically ranging, e.g., from 9"×12", or smaller, to 58"×80", or larger.

A cassette is often used to supply a plurality of unexposed printing plates to an external drum imaging system. The printing plates are normally supplied in stacks of ten to one hundred, depending upon plate thickness, and are stored in the cassette. A plate manager may be used to automatically and selectively unload and feed a printing plate from a plurality of different cassettes to the external drum imaging system for imaging.

The emulsion side of the printing plates is extremely vulnerable to physical damage (e.g., scratches), which could render a printing plate unusable for subsequent printing. Accordingly, great care must be taken to avoid emulsion damage as each printing plate is separated from a stack of printing plates stored within a cassette, fed from the cassette into the external drum imaging system, and mounted onto the external drum for imaging. Unfortunately, preventing such damage has proven to be a very difficult and expensive task in currently available external drum imaging systems.

SUMMARY OF THE INVENTION

The invention is directed towards an apparatus for delivering a printing plate to an external drum platesetter and including: a plate traversing table for displacing a printing plate into a staging position; and a plate angling table, nested within the plate traversing table, for rotating the printing plate between the staging position and a loading position. The plate traversing table includes: a first shaft; a second driven shaft including a plurality of nip rollers; a plurality of pulleys mounted to the first and second shafts; a plurality of rotatable belts, extending between corresponding sets of the pulleys on the first and second shafts; and a drive system for rotating the driven shaft.

BRIEF DESCRIPTION OF THE DRAWINGS

The features of the present invention will best be understood from a detailed description of the invention and embodiments thereof selected for the purpose of illustration and shown in the accompanying drawings in which.

DETAILED DESCRIPTION OF THE INVENTION

Figure 1:
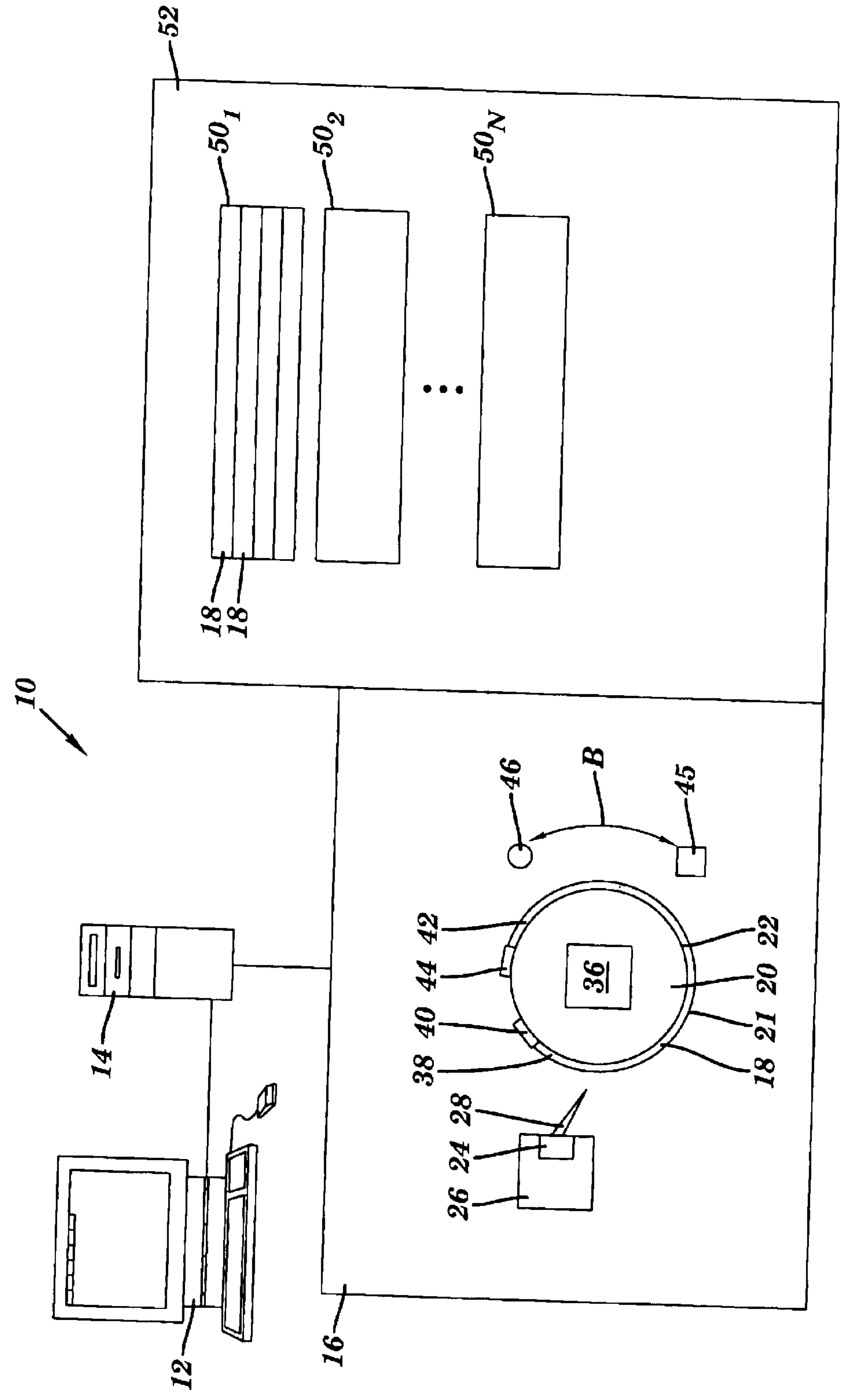
FIG. 1 illustrates an external drum imaging system for recording images onto a supply of recording media such as a printing plate.

The features of the present invention are illustrated in detail in the accompanying drawings, wherein like reference numerals refer to like elements throughout the drawings. Although the drawings are intended to illustrate the present invention, the drawings are not necessarily drawn to scale.

An example of an external drum imaging system 10 is illustrated in FIG. 1. In this example, the imaging system 10 comprises an external drum platesetter configured to record digital data onto a printing plate. Although described below with regard to an external drum platesetter, the printing plate delivering system of the present invention may be used in conjunction with a wide variety of other types of external drum, internal drum, or flatbed imaging systems, including imagesetters and the like, without departing from the intended scope of the present invention.

The imaging system 10 generally includes a front end computer or workstation 12 for the design, layout, editing, and/or processing of digital files representing pages to be printed, a raster image processor (RIP) 14 for further processing the digital pages to provide rasterized page data (e.g., rasterized digital files) for driving an image recorder, and an image recorder or engine, such as an external drum platesetter 16, for recording the rasterized digital files onto a printing plate or other recording media. The external drum platesetter 16 records the digital data (i.e., "job") provided by the RIP 14 onto a supply of photosensitive, radiation sensitive, thermally sensitive, or other type of suitable printing plate 18.

A plurality of printing plates 18 are stored in one or more cassettes $50_1$–$50_N$, located within a plate manager 52. The plate manager 52 is used to automatically and selectively unload and feed a printing plate 18 from one of the cassettes $50_1$–$50_N$, to the external drum platesetter 16 for mounting and subsequent imaging.

Figure 2:
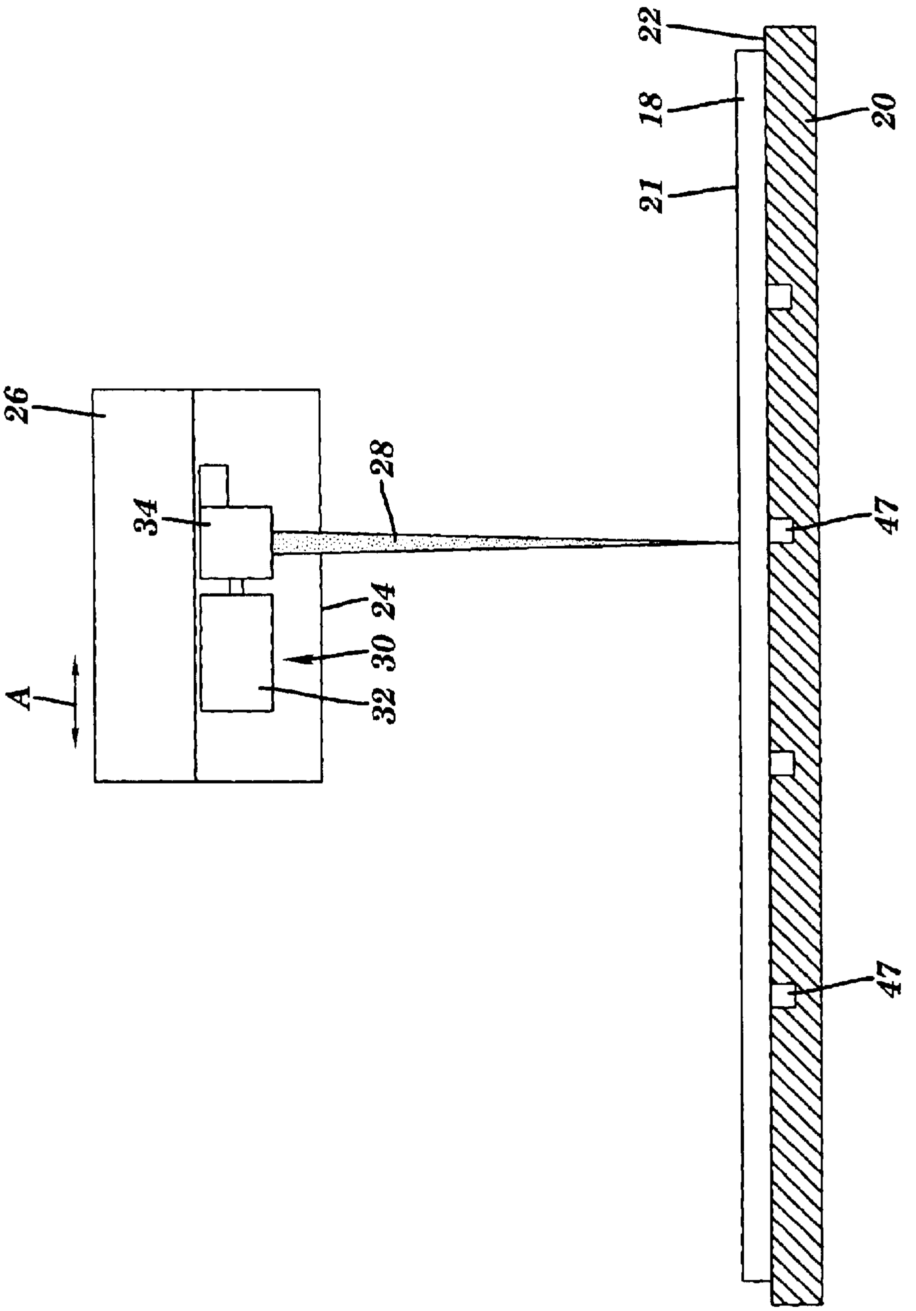
FIG. 2 illustrates an example of an imaging system including a movable optical carriage and scanning system, usable in the external drum imaging system of FIG. 1.

The external drum platesetter 16 includes an external drum 20 having a cylindrical media support surface 22 for supporting a printing plate 18 during imaging. The external drum platesetter 16 further includes a scanning system 24, coupled to a movable carriage 26, for recording digital data onto the imaging surface 21 of the printing plate 18 using one or more imaging beams 28. An example of a scanning system 24 is illustrated in FIG. 2. In particular, the scanning system 24 is displaced by the movable carriage 26 in a slow scan axial direction (directional arrow A) along the length of the rotating external drum 20 to expose the printing plate 18 in a line-wise manner when a single beam is used or in a section-wise manner for multiple beams. Other types of imaging systems may also be used in the present invention.

The external drum 20 is rotated by a drive system 36 in a clockwise or counterclockwise direction as indicated by directional arrow B in FIG. 1. Typically, the drive system 36 rotates the external drum 20 at a rate of about 100–1000 rpm. As further illustrated in FIG. 2, the scanning system 24 typically includes a system 30 for generating the imaging beam or beams 28. The system 30 comprises a light or radiation source 32 for producing the imaging beam or beams 28 (illustrated for simplicity as a single beam), and an optical system 34 positioned between the radiation source 32 and the media support surface 22 for focusing the imaging beam or beams 28 onto the printing plate 18. It should be noted, however, that the system 30 described above is only one of many possible different types of scanning systems that may be used to record image data on the printing plate 18.

In the external drum imaging system 10 shown in FIG. 1, the leading edge 38 of the printing plate 18 is held in position against the media support surface 22 by a leading edge clamping mechanism 40. Similarly, the trailing edge 42 of the printing plate 18 is held in position against the media support surface 22 by a trailing edge clamping mechanism 44. Both the trailing edge clamping mechanism 44 and the leading edge clamping mechanism 40 provide a tangential friction force between the printing plate 18 and the external drum 20 sufficient to resist the tendency of the edges of the printing plate 18 to pull out of the clamping mechanisms 40, 44, at a high drum rotational speed. Other known systems for mounting the printing plate 18 onto the external drum 20 may also be used.

An ironing roller system 46 may be provided to flatten the printing plate 18 against the media support surface 22 of the external drum 20 as the external drum 20 rotates past the ironing roller 46 during the loading of the printing plate 18. Alternately, or in addition, a vacuum source 45 may be used to draw a vacuum through an arrangement of ports and vacuum grooves 47 (see, e.g., FIG. 2) formed in the media support surface 22 to hold the printing plate 18 against the media support surface 22. A registration system (not shown), comprising, for example, a set of registration pins or stops on the external drum 20, and a plate edge detection system (not shown), may be used to accurately and repeatably position and locate the printing plate 18 on the external drum 20.

Figure 3:
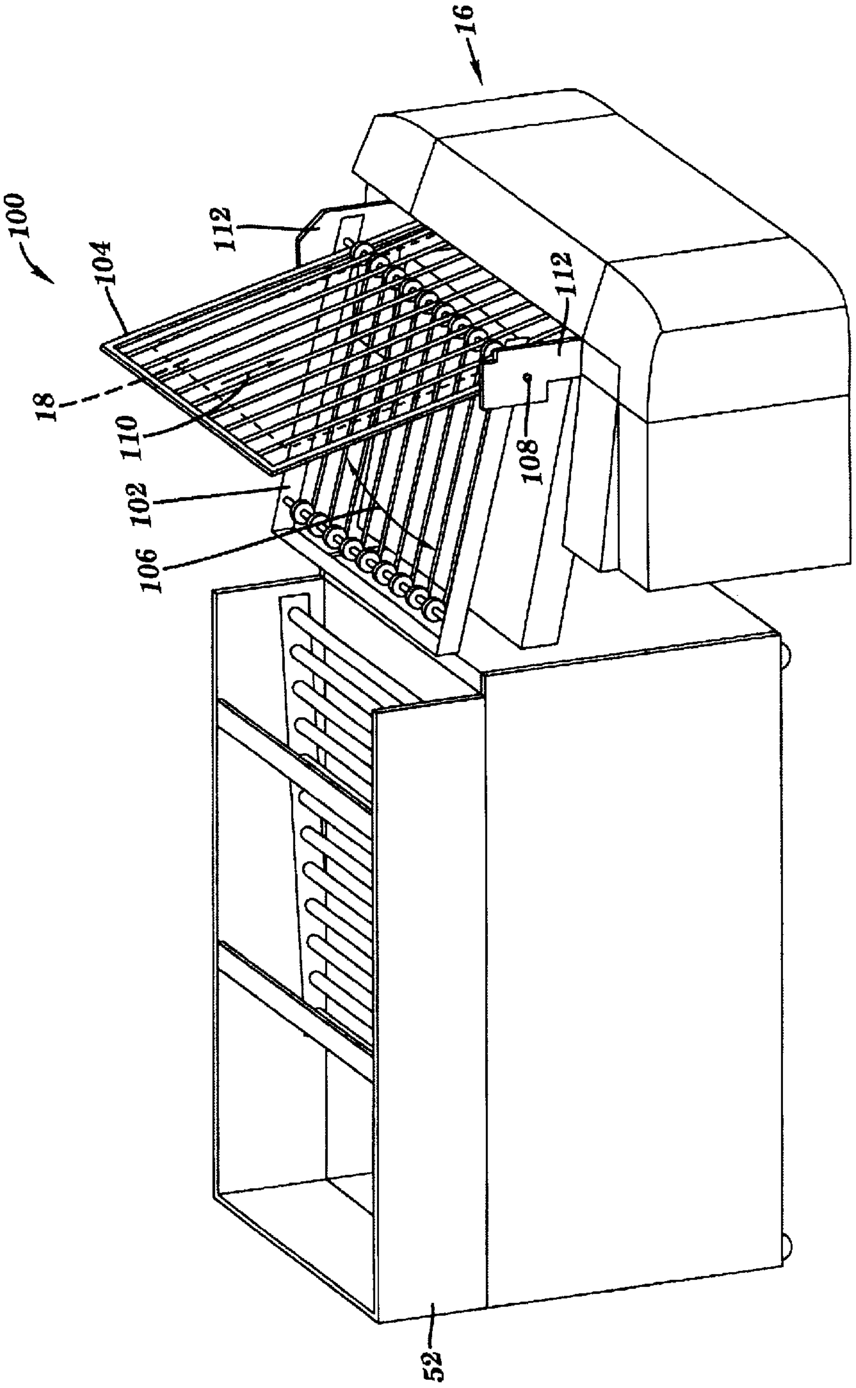
FIG. 3 is a perspective view of an external drum platesetter including a printing plate delivery system in accordance with an embodiment of the present invention, with a plate angling table in a loading position.

The basic structure of an external drum platesetter 16 including a printing plate delivery system 100 in accordance with the present invention is illustrated in FIG. 3. As shown, the printing plate delivery system 100 is configured to deliver a printing plate 18 from a plate manager 52 to the external drum platesetter 16. The printing plate delivery system 100 generally includes a plate traversing table 102 for transferring a printing plate 18 from the plate manager 52 to a staging position, and a plate angling table 104 for rotating the printing plate 18 from the staging position to a plate loading position where the printing plate 18 is ready to be passed into the external drum platesetter 16 for subsequent imaging. The emulsion (i.e., imaging) side of the printing plate 18 faces upward during the displacement of the printing plate 18 from the plate manager 52 to the external drum platesetter 16 and is not contacted by the plate traversing table 102 or plate angling table 104 of the printing plate delivery system 100. This prevents damage to the emulsion on the printing plate 18.

In FIG. 3, the plate angling table 104 is shown in the plate loading position supporting a printing plate 18 (illustrated in phantom) above the input nips (not shown) of the external drum platesetter 16. As depicted by directional arrow 106, the plate angling table 104 is rotatable about an axis 108 between a nested position, where the plate angling table 104 is nested within the plate traversing table 102, and the loading position. In the present embodiment, the plate angling table 104 is shown positioned 15 degrees from vertical while in the loading position. This angle of inclination may vary depending upon the type/configuration of external drum platesetter 16, the required loading (feeding) angle/plane of the printing plate 18, or other factors. From the loading position, the printing plate 18 is driven into the external drum platesetter 16 by the input nips as indicated by directional arrow 110. The plate traversing table 102 and plate angling table 104 are mounted to brackets 112 that are attached to the external drum platesetter 16.

Figure 4:
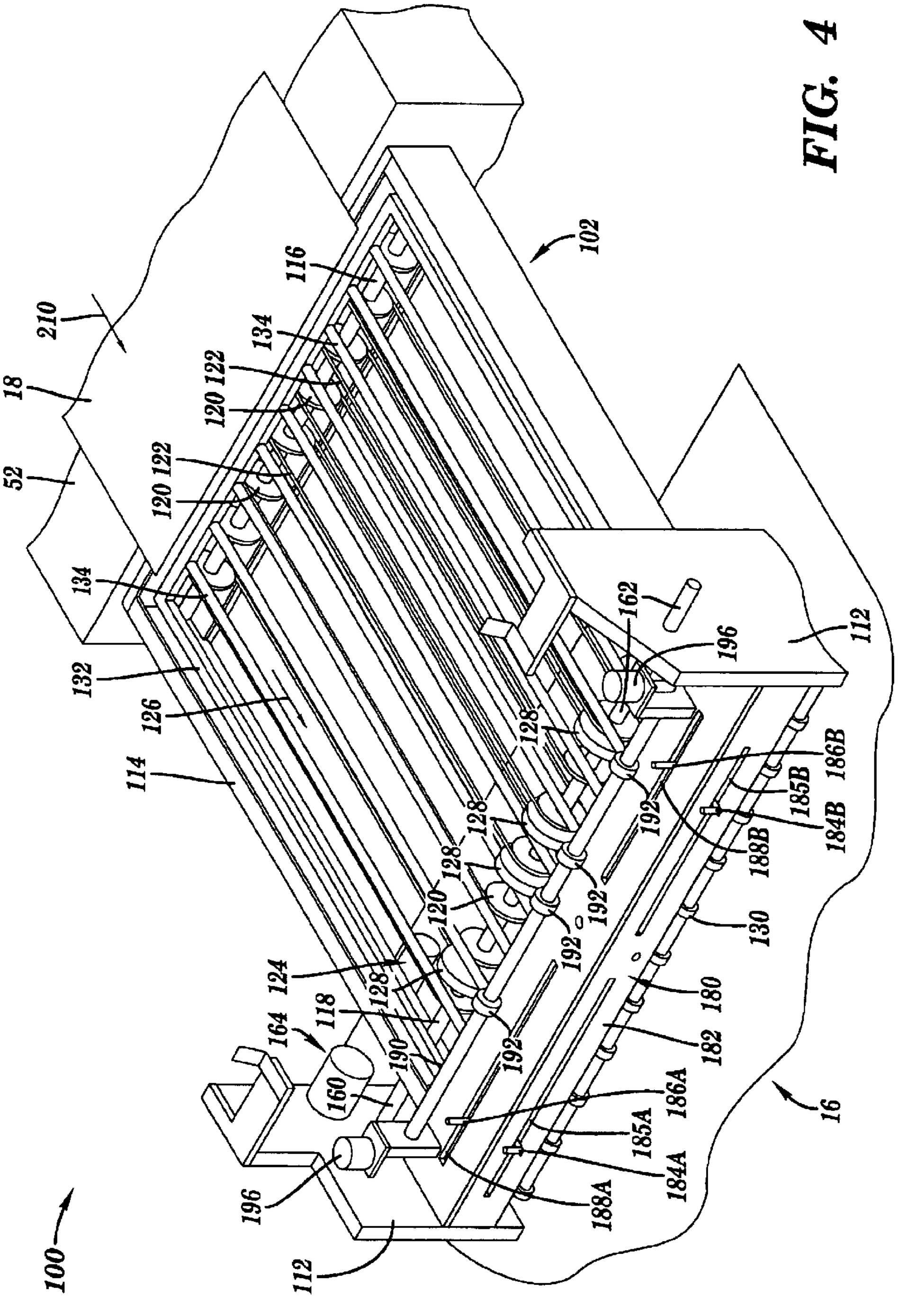
FIG. 4 illustrates the printing plate delivery system of the present invention in greater detail, with the plate angling table nested within a plate traversing table.

The printing plate delivery system 100, with the plate angling table 104 in its nested position within the plate traversing table 102, is depicted in greater detail in FIG. 4. As shown, the plate traversing table 102 comprises a frame 114 to which are rotatably mounted a first pulley shaft 116 and a second, driven pulley shaft 118. Each pulley shaft 116, 118, includes a plurality of pulleys 120. A plurality of belts 122 extend between corresponding sets of the pulleys 120 on the pulley shafts 116, 118. A drive system 124, such as a motor, etc., is coupled to the driven pulley shaft 118 and provides selective rotation of the driven pulley shaft 118. Rotation of the driven pulley shaft 118 causes a rotation of the belts 122 about the pulleys 120 on the pulley shafts 116, 118, as indicated by directional arrow 126. The rotation of the belts 120 displaces a printing plate 18 from the plate manager 52 onto the plate traversing table 102. Displacement of the printing plate 18 continues until a leading edge of the printing plate 18 contacts a plurality of stops 184A, 184B. A plate presence sensor (not shown) is provided to sense the location of the printing plate 18 on the plate traversing table 102 and to control the operation of the drive system 124.

Figure 5:
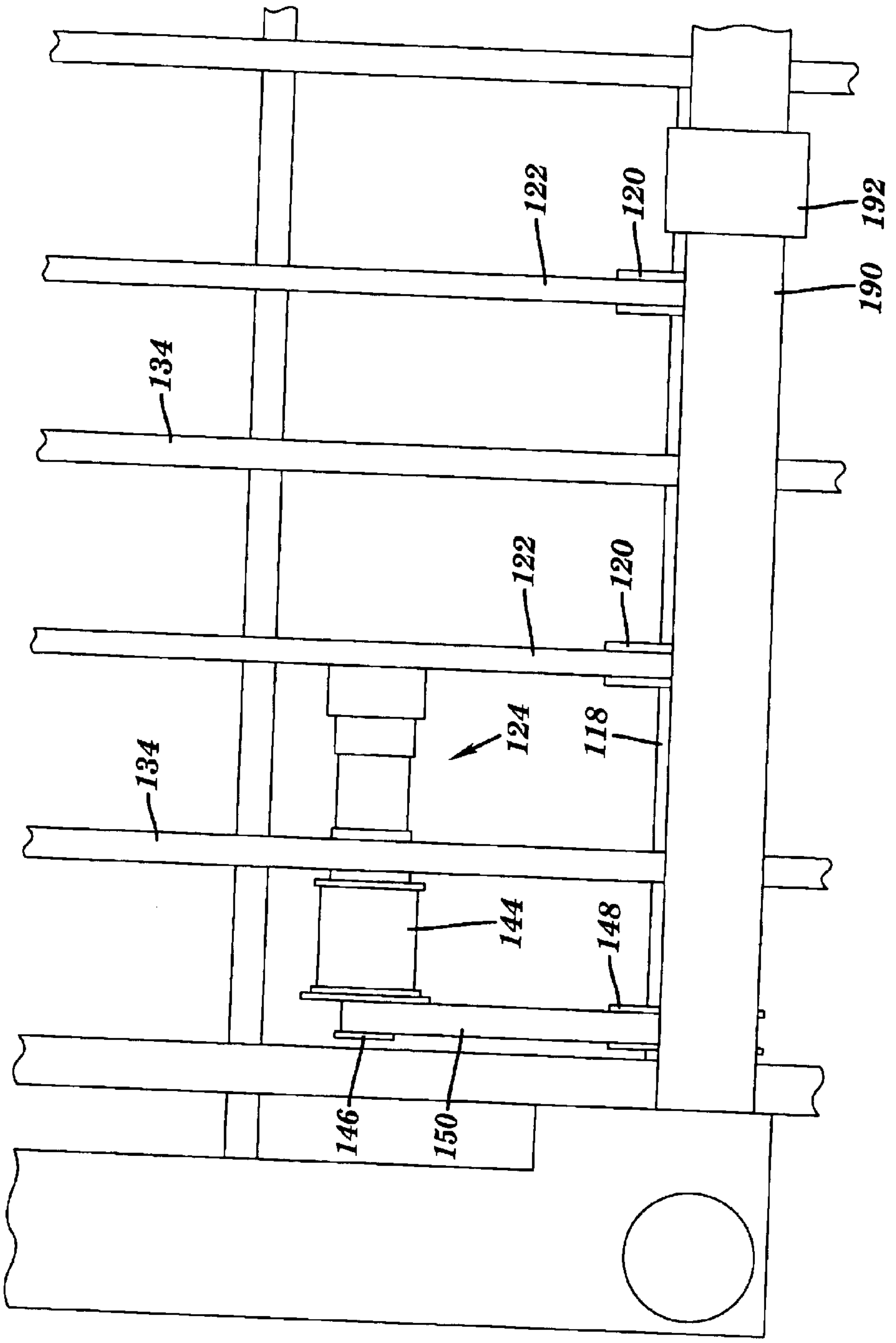
FIG. 5 illustrates the drive system of the plate traversing table.

The drive system 124 for rotating the driven pulley shaft 118 of the plate traversing table 102 is illustrated in greater detail in FIG. 5. The drive system 124 includes a motor 144, a drive pulley 146 coupled to the shaft of the motor 144, a shaft pulley 148 coupled to the driven pulley shaft 118, and a belt 150 positioned about the drive and shaft pulleys 146, 148, for translating the rotary motion of the drive pulley 146 to a rotation of the shaft pulley 148 and driven pulley shaft

118. Also shown in greater detail in FIG. 5 are two of the pulleys 120 and belts 122 used to displace a printing plate 18 across the plate traversing table 102 from the plate manager 52 to the external drum platesetter 16.

Figure 8:
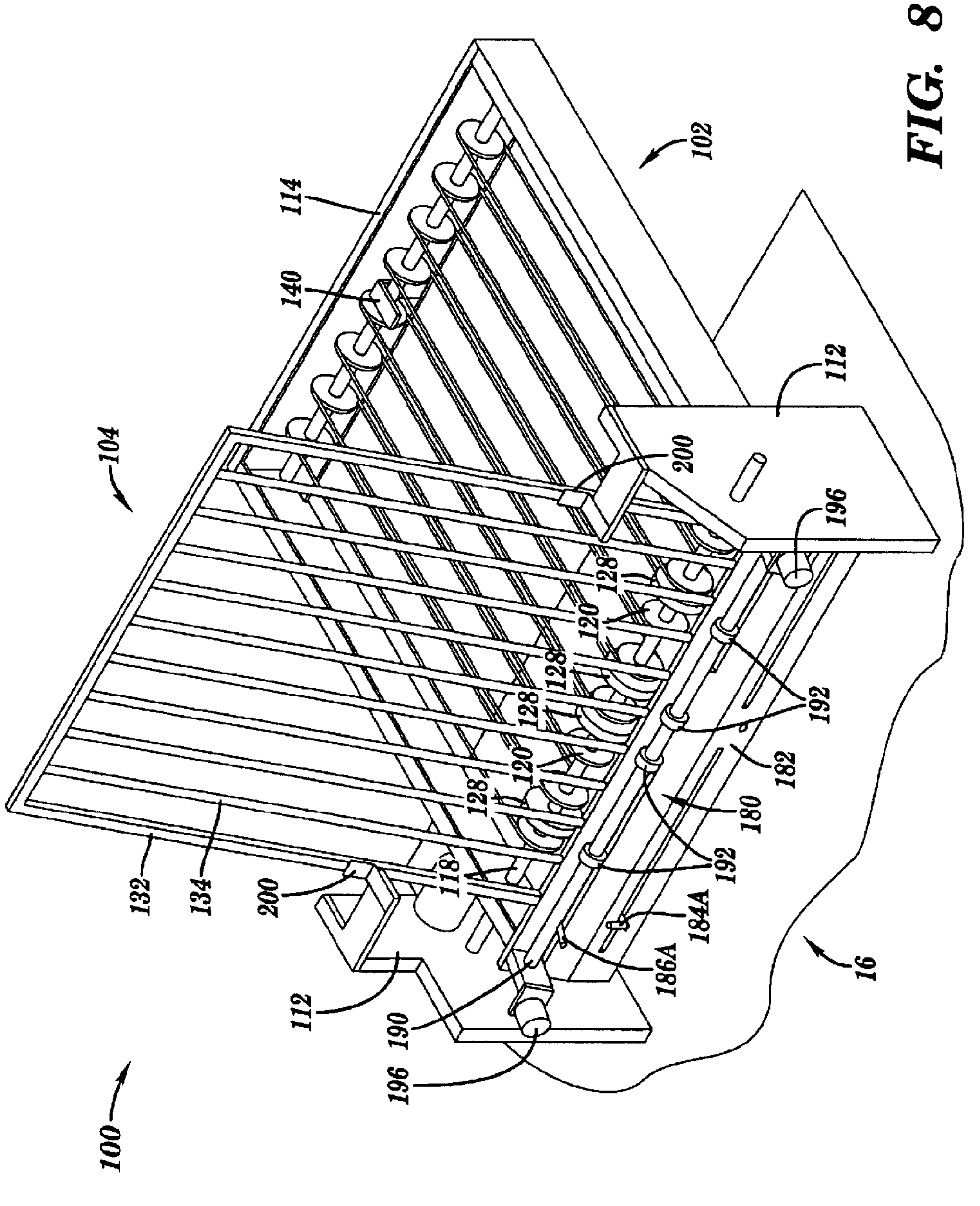
FIG. 8 illustrates the plate angling table in a loading position.

Referring again to FIG. 4, a plurality of nip rollers 128 are also mounted on the driven pulley shaft 118. As will be detailed in greater detail below, the nip rollers 128, which are also driven by drive system 124, are used to displace a leading edge of the printing plate 18 between the input nips 130 of the external drum platesetter 16. This displacement occurs with the plate angling table 104 in the loading position as shown in FIGS. 3 and 8.

The plate angling table 104 comprises a frame 132 and a plurality of support beams 134. The support beams 134 extend across the frame 132 in a direction parallel to the belts 122 of the plate traversing table 102. The support beams 134 support the printing plate 18 in the loading position, and as the plate angling table 104 rotates between its nested and loading positions. In the loading position, the support beams 134 also guide the printing plate downward into the external drum platesetter 16.

In the nested position, the plate angling table 104 is nested within the plate traversing table 102. As shown in cross-section in FIG. 6, the frame 132 and support beams 134 of the plate angling table 104 do not extend above the plane 136 formed by the belts 122 of the plate traversing table 102. As such, the plate angling table 104 does not obstruct a printing plate 18 as it is displaced from the plate manager 52 onto and across the plate traversing table 102. The use of such a nested configuration also reduces the size of the printing plate delivery system 100.

Figure 6:
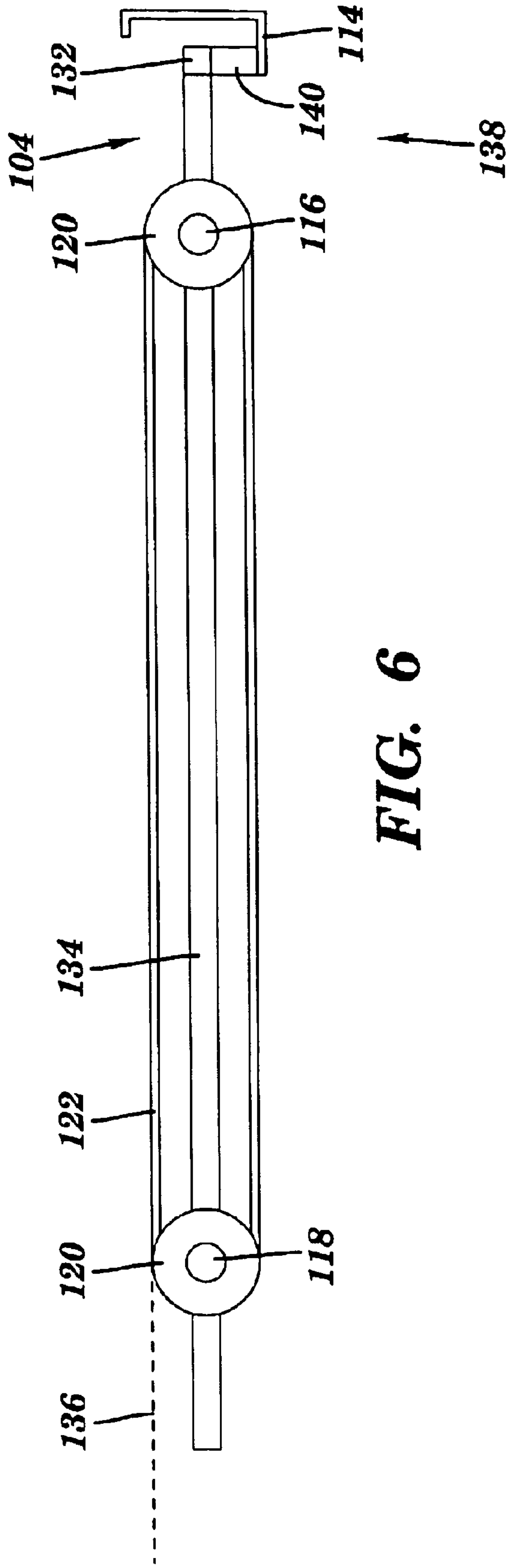
FIG. 6 is a cross-sectional view of the plate angling table nested within the plate traversing table.

Also shown in FIG. 6 is a system for securing the plate angling table 104 in its nested position within the plate traversing table 102. The securing system, in this embodiment of the present invention, includes a magnet 140 attached to the frame 114 of the plate traversing table 102 (see also FIG. 8). If the frame 132 of the plate angling table 104 is formed of a non-magnetic material, a complementary magnet or magnetic member (not shown) may be attached to the frame 132. Other suitable securing systems, such as an electro-mechanically actuated latch, etc., may be used in lieu of the magnet 140. The securing system 138 ensures that the plate angling table remains nested within the plate traversing table 102, and prevents the plate angling table 104 from contacting a printing plate 18 as the printing plate 18 is displaced across the plate traversing table 102 from the plate manager 52 toward the external drum platesetter 16 by the belts 122. The securing system 138, however, does not prevent the plate angling table 104 from being rotated from its nested position within the plate traversing table 102 to its loading position.

Figure 7:
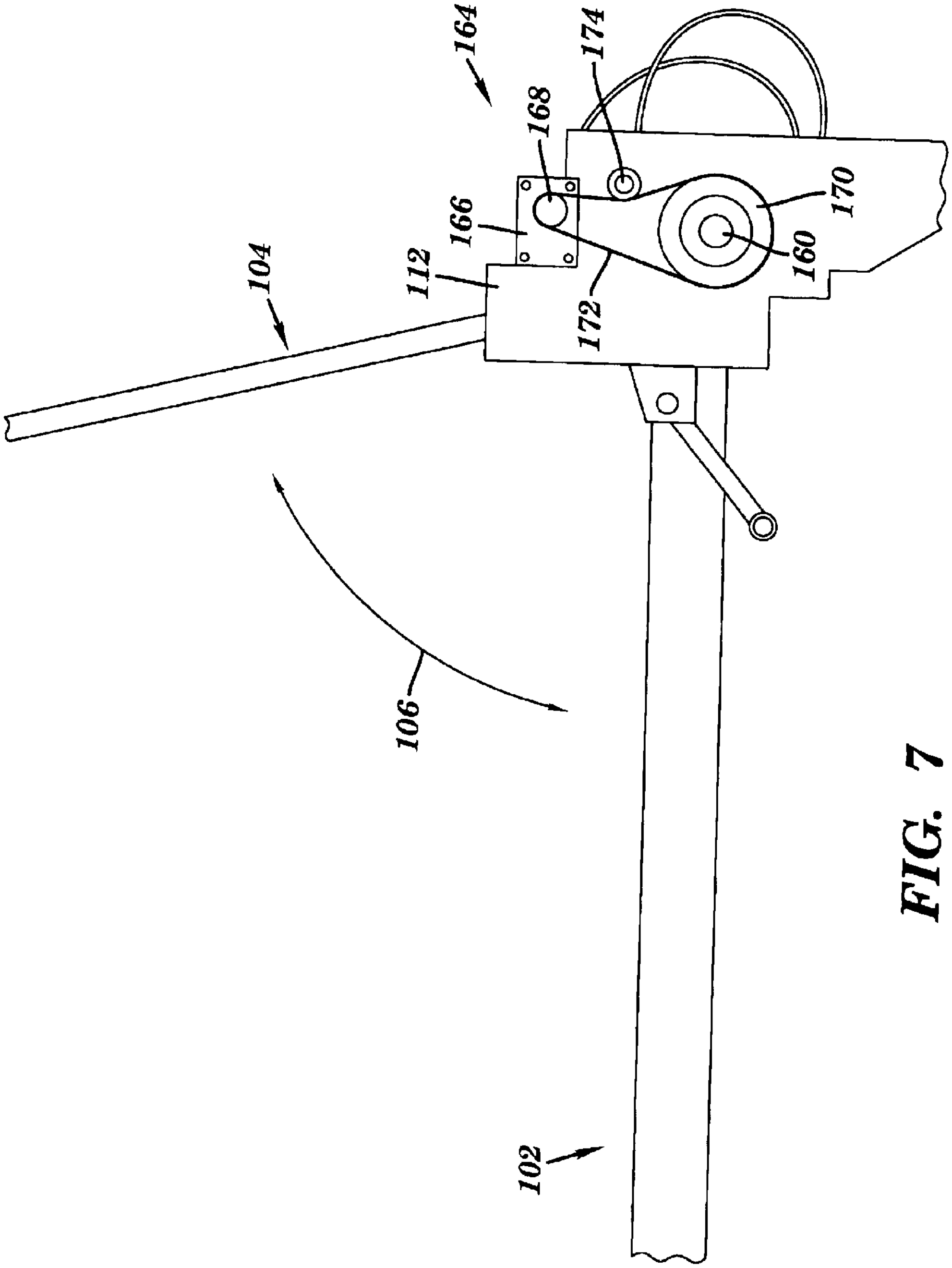
FIG. 7 illustrates the drive system of the plate angling table.

Referring again to FIG. 4, the frame 132 of the plate angling table 104 is rotatably mounted to the brackets 112 of the printing plate delivery system 100 by a driven shaft 160 and a follower shaft 162. A drive system 164, coupled to the driven shaft 160, is provided to selectively rotate the plate angling table 104 from its nested position within the plate traversing table 102 to its loading position. In this embodiment of the present invention, as illustrated in FIG. 7, the drive system 164 comprises a motor 166, a drive pulley 168 coupled to the shaft of the motor 166, a shaft pulley 170 mounted about an end of the driven shaft 160, and a belt 172. The belt 172, which is positioned about the drive and shaft pulleys 168, 170, translates the rotary motion of the drive pulley 168 to a rotation of the shaft pulley 170 and the driven shaft 160. A rotation of the driven shaft 160 results in a corresponding rotation of the plate angling table 104 as indicated by directional arrow 106. A clutch mechanism 174 may also be provided to prevent damage to the drive system 164.

As further illustrated in FIG. 4, a plate locating system 180 is also mounted to the frame 132 of the plate angling table 104. The plate locating system 180 includes a tray 182, a pair of movable stops 184A, 184B, and a pair of movable centralizer pins 186A, 186B. The stops 184A, 184B, are movably positioned along the bottom edge of the tray 182. The stops 184A, 184B, are designed to limit the displacement of a printing plate 18 across the plate traversing table 102. The stops 184A, 184B, may be automatically/manually moved along slots 185A, 185B, respectively, to different locations along the bottom edge of the tray 182 to accommodate printing plates 18 of various widths. The centralizer pins 186A, 186B, are located within slots 188A, 188B, respectively, formed in the tray 182. A displacing system (not shown) is provided to displace the centralizer pins 186A, 186B, along the slots 188A, 188B. In operation, with a printing plate located in the loading position, the centralizer pins 186A, 186B, are displaced so as to center-justify the printing plate 18 on the plate angling table 104 relative to the external drum of the external drum platesetter 16. The centralizer pins 186A, 186B, contact at least one side of the printing plate 18 as they are displaced and effectively "push" the printing plate 18 sideways over the stops 184A, 184B, until it is properly positioned for loading into the external drum platesetter 16. At this time, the centralizer pins 186A, 186B, contact opposing sides of the printing plate 18.

As further illustrated in FIGS. 4 and 8, a displaceable, freely rotatable shaft 190 having a plurality of nip rollers 192 is also mounted to the frame 132 of the plate angling table 104. The nip rollers 192 on the shaft 190 are aligned with the nip rollers 128 on the driven shaft 118 of the plate traversing table 102. The nip rollers 128, 192, cooperate to displace a leading edge of a printing plate 18 between the input nips 130 of the external drum platesetter 16. This occurs with the plate angling table 104 located in its loading position (see, e.g., FIGS. 3 and 8).

The shaft 190 is displaced toward or away from the driven shaft 118 of the plate traversing table 102 by a pair of actuators 196. The actuators 196 may comprise pneumatic cylinders, solenoids, etc.

When the plate angling table 104 is in its nested position (FIG. 4), the shaft 190 is held in an extended position away from the driven shaft 118 of the plate traversing table 102 by the actuators 196. This creates a space between the nip rollers 192 on the shaft 190 and the nip rollers 128 on the driven shaft 118 through which a printing plate 18 can be displaced by the belts 122 of the plate traversing table 102. After the plate angling table 104 has been rotated to its loading position, and the printing plate 18 has been center-justified by the centralizer pins 186A, 186B, the shaft 190 is retracted toward the driven shaft 118 by the actuators 196. This pinches the printing plate 18 between the nip rollers 192 on the shaft 190 and the nip rollers 128 on the driven shaft 118. As such, a rotation of the driven shaft 118 will now result in a displacement of the printing plate 18 into the external drum platesetter 16. Before this displacement can occur, however, the stops 184A, 184B, are moved out of the way of the leading edge of the printing plate 18.

As detailed above, the plate locating system 180 and the shaft 190 are both mounted to the frame 132 of the plate angling table 104. As a result, the plate locating system 180 and the shaft 190 rotate along with the plate angling table 104 as the plate angling table 104 is rotated between its nested and loading positions. This can be seen by comparing FIGS. 4 and 8. As shown in FIG. 8, the tray 182, which is orientated along the same plane as the plate angling table 104, helps to guide a printing plate 18 downward into the input nips of the external drum platesetter 16.

Referring again to FIG. 8, there is illustrated a system for securing the plate angling table 104 in its loading position. The securing system includes a pair of magnets 200 mounted to the brackets 112 of the printing plate delivery system 100. If the frame 132 of the plate angling table 104 is formed of a non-magnetic material, a complementary magnet or magnetic member (not shown) may be attached to the frame 132. Other suitable securing systems, such as an electro-mechanically actuated latch, etc., may be used in lieu of the magnets 200. It should be clear that the drive system 164 for rotating the plate angling table 104 is capable of detaching the frame 132 of the plate angling table 104 from the magnets 200 (and the magnet 140) when the plate angling table 104 is rotated between its nested and loading positions.

The operation of the printing plate delivery system 100 of the present invention can be summarized as follows, with reference to FIGS. 3, 4, 7 and 8:

1. A printing plate 18 is fed onto the plate traversing table 102 from the plate manager 52.
2. The belts 122 of the plate traversing table 102 are rotated by the drive system 124 to displace the printing plate 18 horizontally across the plate traversing table 102 as indicated by directional arrow 210 in FIG. 4. Displacement of the printing plate 18 continues until the leading edge of the printing plate 18 contacts the stops 184A, 184B, of the plate locating system 180. The drive system 124 is then shut off, stopping the rotation of the belts 122. The printing plate 18 is now located in the staging position.
3. The plate angling table 104 is rotated by drive system 164 from its nested position within the plate traversing table 102 to its loading position. The rotation of the plate angling table 104 lifts the printing plate 18 off of the belts 122 of the plate traversing table 102 and positions the printing plate 18 in its required feed plane (in this embodiment 15 degrees from vertical) above the input nips 130 of the external drum platesetter 16.
4. The printing plate 18, which is prevented from moving into the input nips 130 of the external drum platesetter 16 by the stops 184A, 184B, of the plate locating system 180, is then center-justified by the pair of movable centralizer pins 186A, 186B, of the plate locating system 180.
5. The shaft 190 is subsequently retracted toward the driven shaft 118 of the plate traversing table 102 by the actuators 196. This pinches the printing plate 18 between the nip rollers 192 on the shaft 190 and the nip rollers 128 on the driven shaft 118. The stops 184A, 184B, are then moved out of the way of the leading edge of the printing plate 18.
6. The driven shaft 118 is then rotated by the drive system 124 to insert the leading edge of the printing plate 18 into the input nips 130 of the external drum platesetter 16. The printing plate 18 is then mounted onto the external drum for subsequent imaging.
7. The plate angling table 104 is rotated by drive system 164 from its loading position to its nested position within the plate traversing table 102. At this time, another printing plate 18 may be fed onto the plate traversing table 102 from the plate manager 52.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

We claim:

1. An apparatus for delivering a printing plate to an external drum platesetter, comprising:

a plate traversing table for displacing a printing plate into a staging position; and a plate angling table, nested within the plate traversing table, for rotating the printing plate between the staging position and a loading position, said plate traversing table comprising:

a first shaft;

a second driven shaft including a plurality of nip rollers;

a plurality of pulleys mounted to the first and second shafts;

a plurality of rotatable belts, extending between corresponding sets of the pulleys on the first and second shafts; and a drive system for rotating the driven shaft.

2. The apparatus of claim 1, wherein the plate angling table comprises:

a frame; and a plurality of support beams extending across the frame.

3. The apparatus of claim 2, further comprising:

a system for mounting the frame of the plate angling table for rotation relative to the plate traversing table.

4. The apparatus of claim 3, wherein the mounting system comprises:

at least one shaft coupled to the plate angling table; and a drive system for rotating the shaft to displace the plate angling table between a nested position within the plate traversing table and the loading position.

5. The apparatus of claim 1, further comprising:

a plate locating system coupled to the plate angling table.

6. The apparatus of claim 5, wherein the plate locating system comprises:

a system for limiting a displacement of the printing plate on the plate traversing table; and a system for positioning the printing plate on the plate traversing table.

7. The apparatus of claim 6, wherein the system for limiting a displacement of the printing plate comprises a plurality of movable stops.

8. The apparatus of claim 6, wherein the system for positioning the printing plate comprises a plurality of movable pins for adjusting a position of the printing plate on the plate traversing table.

9. The apparatus of claim 1, further comprising:

a displaceable shaft coupled to the plate angling table, wherein the displaceable shaft includes a plurality of nip rollers aligned with the nip rollers of the driven shaft of the plate traversing table.

10. The apparatus of claim 9, further comprising:

an actuating system for selectively displacing the nip rollers on the displaceable shaft toward and away from the nip rollers on the driven shaft of the plate traversing table.

11. The apparatus of claim 10, wherein the nip rollers on the displaceable shaft are extended away from the nip rollers on the driven shaft of the plate traversing table during a displacement of the printing plate on the plate traversing table.

12. The apparatus of claim 1, further comprising:

a plate manager for supplying a printing plate to the plate traversing table.

13. The apparatus of claim 1, further comprising:

a system for securing the plate angling table in a nested position within the plate conveying table.

14. The apparatus of claim 1, further comprising:

a system for securing the plate angling table in the loading position.

15. An external drum platesetter, comprising:

an external drum having a media support surface;

a mounting system for mounting a printing plate on the media support surface;

a system for delivering the printing plate to the mounting system; and a scanning system for imaging data onto the printing plate;

wherein the delivering system comprises:

a plate traversing table for receiving the printing plate from a supply of printing plates and for displacing the printing plate into a staging position; and a plate angling table, nested within the plate traversing table, for rotating the printing plate between the staging position and a loading position.

16. The external drum platesetter of claim 15, wherein the plate traversing table comprises:

a first shaft;

a second, driven shaft;

a plurality of pulleys mounted to the first and second shafts;

a plurality of rotatable belts, extending between corresponding sets of the pulleys on the first and second shafts; and a drive system for rotating the driven shaft.

17. The external drum platesetter of claim 16, wherein the driven shaft of the plate traversing table includes a plurality of nip rollers.

18. The external drum platesetter of claim 17, further comprising:

a displaceable shaft coupled to the plate angling table, wherein the displaceable shaft includes a plurality of nip rollers aligned with the nip rollers of the driven shaft of the plate traversing table.

19. The external drum platesetter of claim 18, further comprising:

an actuating system for selectively displacing the nip rollers on the displaceable shaft toward and away from the nip rollers on the driven shaft of the plate traversing table.

20. The external drum platesetter of claim 19, wherein the nip rollers on the displaceable shaft are extended away from the nip rollers on the driven shaft of the plate traversing table during a displacement of the printing plate on the plate traversing table.

21. The external drum platesetter of claim 19, wherein the nip rollers on the displaceable shaft are retracted toward the nip rollers on the driven shaft of the plate traversing table when the plate angling table is in the loading position, and wherein a rotation of the driven shaft of the plate traversing table causes a displacement of the printing plate toward the mounting system.

22. The external drum platesetter of claim 15, wherein the plate angling table comprises:

a frame; and a plurality of support beams extending across the frame.

23. The external drum platesetter of claim 22, further comprising:

a system for mounting the frame of the plate angling table for rotation relative to the plate traversing table.

24. The external drum platesetter of claim 23, wherein the mounting system comprises:

at least one shaft coupled to the plate angling table; and a drive system for rotating the shaft to displace the plate angling table between a nested position within the plate traversing table and the loading position.

25. The external drum platesetter of claim 15, further comprising:

a plate locating system coupled to the plate angling table, wherein the plate locating system comprises:

a system for limiting a displacement of the printing plate on the plate traversing table; and a system for positioning the printing plate relative to the external drum.

26. The external drum platesetter of claim 25, wherein the system for limiting a displacement of the printing plate comprises a plurality of movable stops.

27. The external drum platesetter of claim 25, wherein the system for positioning the printing plate comprises a plurality of movable pins for justifying the printing plate relative to the external drum.

* * * * *